(12) United States Patent
Galasso et al.

(10) Patent No.: US 9,334,009 B2
(45) Date of Patent: May 10, 2016

(54) METHODS AND APPARATUS RELATED TO A UNITARY FORK BRACE

(71) Applicant: Fox Factory, Inc., Watsonville, CA (US)

(72) Inventors: Mario Galasso, Sandy Hook, CT (US); William M. Becker, Aptos, CA (US); Andrew Laird, Los Gatos, CA (US)

(73) Assignee: Fox Factory, Inc., Watsonville, CA (US)

( * ) Notice: Subject to any disclaimer, the term of this patent is extended or adjusted under 35 U.S.C. 154(b) by 0 days.

(21) Appl. No.: 14/704,851

(22) Filed: May 5, 2015

(65) Prior Publication Data

US 2015/0232146 A1    Aug. 20, 2015

Related U.S. Application Data

(62) Division of application No. 12/412,199, filed on Mar. 26, 2009, now Pat. No. 9,027,947.

(60) Provisional application No. 61/039,497, filed on Mar. 26, 2008.

(51) Int. Cl.
*B62K 21/02* (2006.01)
*B62K 25/08* (2006.01)

(52) U.S. Cl.
CPC ............. *B62K 21/02* (2013.01); *B62K 25/08* (2013.01); *Y10T 29/49622* (2015.01); *Y10T 156/10* (2015.01)

(58) Field of Classification Search
CPC ....... B62K 21/02; B62K 25/08; Y10T 156/10
USPC ................................... 156/60, 91, 92
See application file for complete search history.

(56) References Cited

U.S. PATENT DOCUMENTS

| | | |
|---|---|---|
| 345,465 A | 7/1886 | Waite |
| 589,147 A | 8/1897 | Sturges |
| 609,937 A | 8/1898 | David |
| 660,875 A | 10/1900 | Wambach et al. |
| 1,998,992 A | 4/1935 | Johnson et al. |
| 4,971,344 A | 11/1990 | Turner |
| 5,011,172 A | 4/1991 | Bellanca et al. |
| 5,016,895 A | 5/1991 | Hollingsworth et al. |
| 5,078,417 A | 1/1992 | Mouritsen et al. |
| 5,464,240 A | 11/1995 | Robinson et al. |
| 5,653,007 A | 8/1997 | Boyer et al. |
| 5,715,903 A * | 2/1998 | Summers et al. ............. 180/219 |
| 5,791,673 A | 8/1998 | Patterson et al. |
| 5,803,477 A | 9/1998 | Reisinger et al. |
| 5,913,529 A | 6/1999 | Patterson et al. |
| 6,607,185 B2 | 8/2003 | Graves et al. |

(Continued)

FOREIGN PATENT DOCUMENTS

| EP | 2181918 A2 | 5/2010 |
|---|---|---|
| JP | 11198881 A | 7/1999 |

OTHER PUBLICATIONS

U.S. Appl. No. 61/039,497, filed Mar. 26, 2008, 14 Pages.

*Primary Examiner* — Carson Gross

(57) ABSTRACT

Embodiments of a fork brace for a bicycle are disclosed herein. In one aspect, a brace portion is integrally formed along with two tubular fork members and an overlay fits in a mating relationship with the brace portion to create a unitary, tubular brace.

3 Claims, 7 Drawing Sheets

(56) References Cited

U.S. PATENT DOCUMENTS

| | | |
|---|---|---|
| RE38,669 E | 12/2004 | Voss et al. |
| 7,073,807 B2 | 7/2006 | Masui et al. |
| 7,464,950 B2 | 12/2008 | Schuman et al. |
| 7,543,835 B2 | 6/2009 | Murphy et al. |
| 7,546,818 B2 | 6/2009 | Hirayama et al. |
| 7,621,549 B2 | 11/2009 | Van et al. |
| 7,850,032 B2 | 12/2010 | Carnevali et al. |
| 8,096,391 B2 | 1/2012 | White et al. |
| 8,104,782 B2 | 1/2012 | Achenbach et al. |
| 9,027,947 B2 | 5/2015 | Galasso et al. |
| 2006/0169689 A1 | 8/2006 | Carnevali et al. |
| 2007/0257466 A1 | 11/2007 | Murphy et al. |
| 2008/0035431 A1 | 2/2008 | Vroomen et al. |
| 2008/0066698 A1* | 3/2008 | Hirayama et al. ......... 123/41.62 |
| 2009/0243251 A1 | 10/2009 | Galasso et al. |

* cited by examiner

METHODS AND APPARATUS RELATED TO A UNITARY FORK BRACE

CROSS-REFERENCE TO RELATED APPLICATIONS

This application claims the benefit of and claims priority to the co-pending U.S. patent application Ser. No. 14/412,199 filed on Mar. 26, 2009, entitled "METHODS AND APPARATUS RELATED TO A UNITARY FORK BRACE" by Mario Galasso et al., assigned to the assignee of the present application, and is hereby incorporated by reference in its entirety.

The application Ser. No. 12/412,199 claims the benefit of and claims priority to the U.S. Provisional Patent Application Ser. No. 61/039,497, filed Mar. 26, 2008, entitled "METHODS AND APPARATUS FOR STRUCTURAL REINFORCEMENT OF VEHICLE SUSPENSION" by Mario Galasso et al., assigned to the assignee of the present application, and is hereby incorporated by reference in its entirety.

FIELD OF THE INVENTION

Embodiments of the invention generally relate to methods and apparatus for use in vehicle suspension. Particular embodiments of the invention relate to methods and apparatus useful for structural reinforcement of suspension components, more particularly, reinforcement of front forks using a brace comprising a base portion and an overlay portion to produce a rigid structural unit.

BACKGROUND OF THE INVENTION

Vehicle suspension systems typically include structures that must resist forces tending to twist and/or bend those structures. Further, it is desirable that such structures be maintained in position relative to one another. That often means that the structures and/or their connection to one another need to be suitably reinforced. In many applications, it is also desirable to minimize the weight of vehicle components, including suspension components, in order to increase performance. What is needed is a structural reinforcement that is lightweight yet suitably rigid in application. Front forks for bicycles are an example of a component requiring rigidity in order to operate effectively. Each fork is connected at a lower end to an axle and at an upper end to a fork crown. However, as fork travel has been extended, an additional reinforcement has been added in the form of a fork brace extending between the lower fork legs of the front fork suspension unit. FIG. 1 is a Figure of a fork 10 and illustrates the brace 15 extending between the fork legs 20, 25. In the fork of FIG. 1, the fork legs are tubular and the brace is integrally formed between them in order to provide rigidity and keep the forks parallel to one another. The purpose of the brace 15 is to help maintain the fork legs in a substantially parallel relationship while they are being subjected to rider and terrain induced disparate loads.

FIG. 2 is a rear view of an integral brace 15 formed between fork legs 20, 25 and illustrates reinforcement webs 35 used in the brace. Because the fork assembly, including the brace portion is typically cast in one piece, manufacturing limitations prevent the brace from being formed into a tubular shape along with the two tubular forks legs. Instead, the brace 15 has a hollow back portion 30 that includes integral, web-like structures 35. The result is a reasonably rigid brace having additional weight due to the extra webs required to impart rigidity and having no contoured, attractive appearance when viewed from the rear. Such a brace does therefore fail to maximize rigidity between fork leg members while minimizing extra weight associated with such support.

There is a need therefore, for a fork brace that makes use of a tubular cross section even when a portion of the brace is integrally formed with tubular fork legs. There is yet a further need for a fork brace that provides a more contoured, attractive appearance from all angles.

DRAWINGS

SUMMARY OF THE INVENTION

Embodiments of a fork brace for a bicycle are disclosed herein. In one aspect, a brace portion is integrally formed along with two tubular fork members and an overlay fits in a mating relationship with the brace portion to create a unitary, tubular brace.

DESCRIPTION OF A PREFERRED EMBODIMENT

Figure 1:
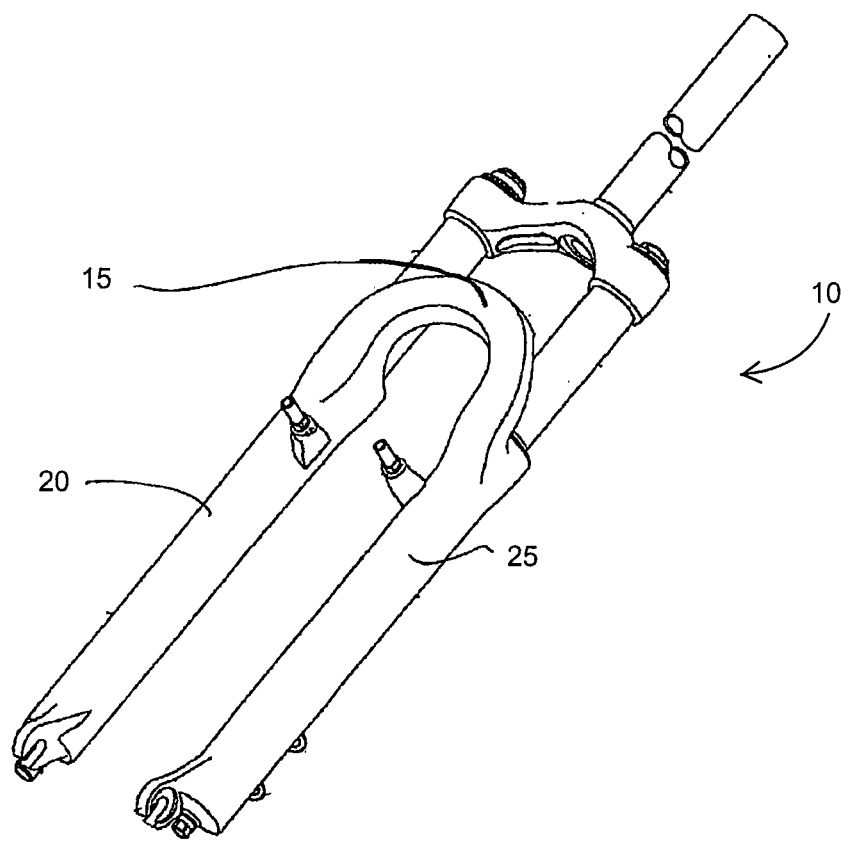
FIG. 1 shows a fork assembly with a brace between the fork legs.
Figure 2:
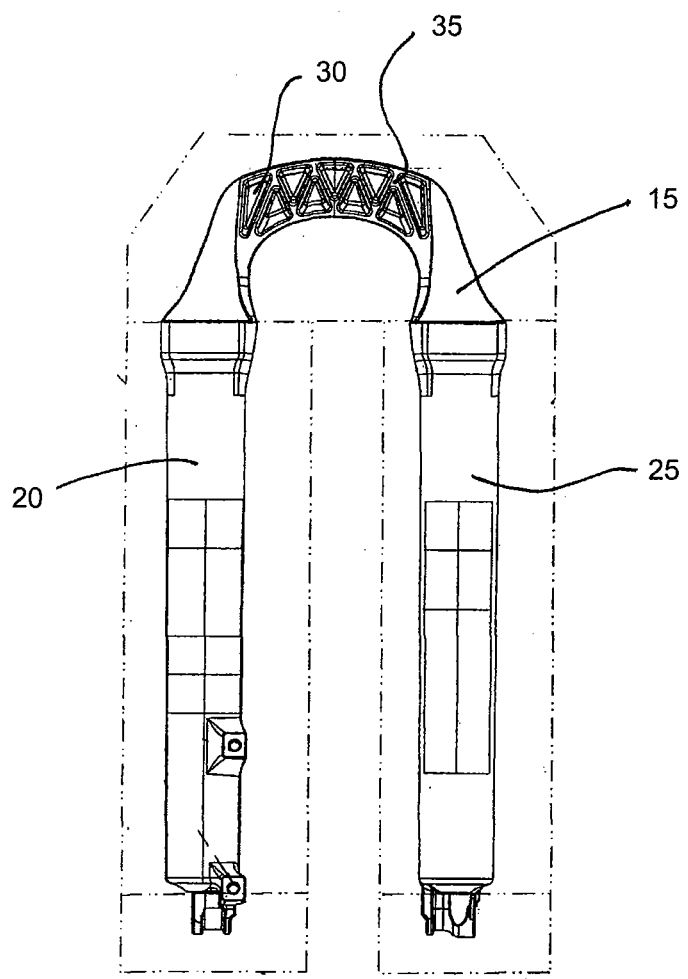
FIG. 2 is a rear view of a brace and illustrates structural reinforcement of the brace.
Figure 3:
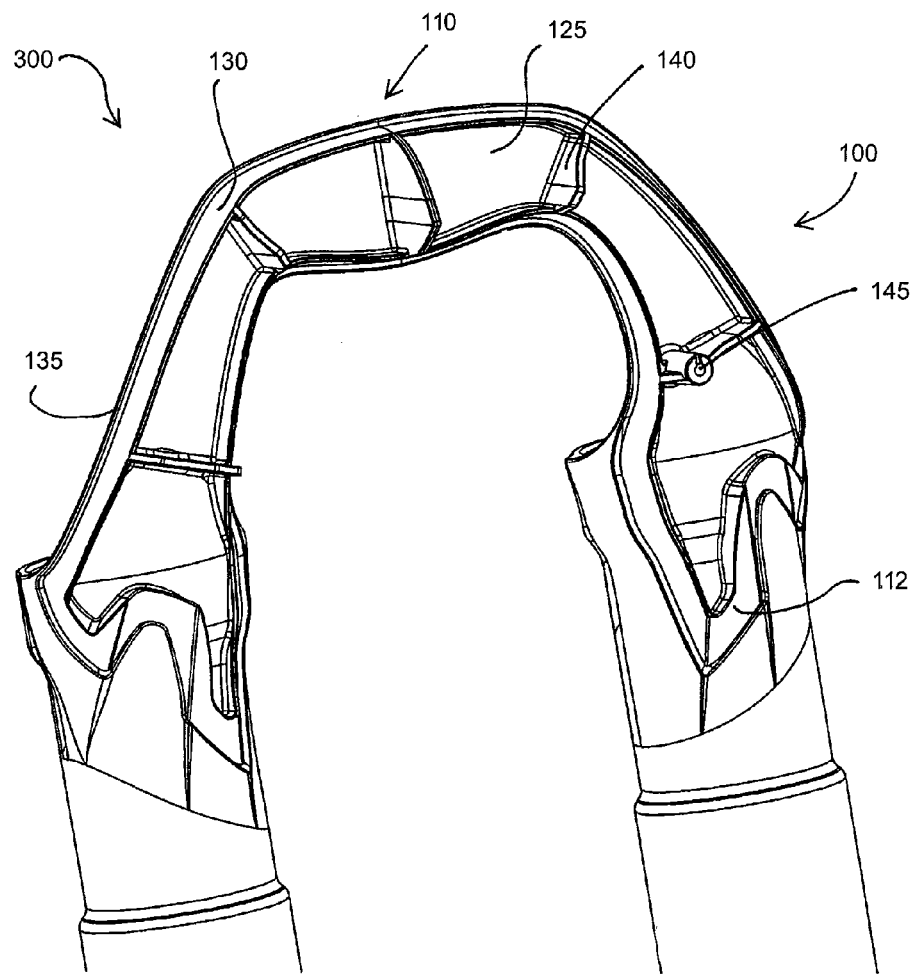
FIG. 3 is a front view of the fork assembly with a rear portion of a brace integrally formed therebetween.
Figure 4:
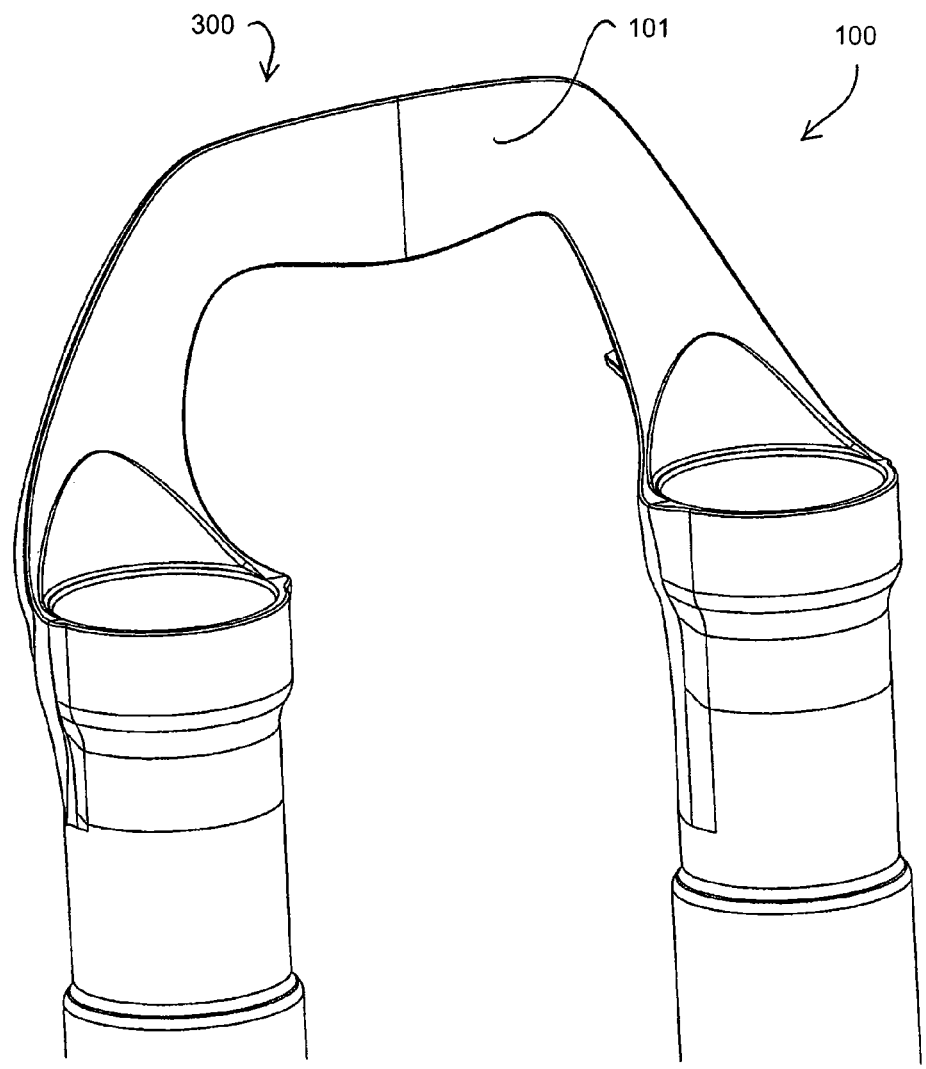
FIG. 4 is a rear view of a fork assembly including an embodiment of the brace.

In one embodiment a two wheeled vehicle such as a bicycle or motorcycle includes a suspension structure comprising a pair of lower, front suspension fork legs connected by a brace. FIG. 3 is a front view showing the front fork assembly 100 with a portion 110 of a brace 300 integrally formed between the fork legs. In the embodiment shown, the brace portion 110 is formed at the same time as the fork legs and of the same metallic material and includes a surface 125 and sides 130 extending around the perimeter of the surface 125. In another embodiment the brace portion 110 may be formed separately from the fork legs, and/or of a different material, and attached thereto. Because it is designed to be used with an overlay (e.g. 200), the portion 110 is formed with an essentially "open" front. The portion 110 also includes a lip 135 formed around its outer perimeter to permit the overlay to be seated, as will be described. Also included are reinforcement members 140 extending from the rear surface past a top edge of the sides 130 and outwardly corresponding to an interior dimension of the assembled brace (with overlay) to add additional rigidity and/or facilitate a connection between the portion and the overlay. In the embodiment shown, a threaded boss 145 is formed in the rear portion to receive a threaded fastener. FIG. 4 is a rear view of the fork assembly of FIG. 3 and shows a smooth, contoured rear surface 101 of the portion 110.

The portion 110 of the brace 300 and the lower fork legs are preferably made of castable material like magnesium, aluminum or titanium but can be made of fiber reinforced polymer (e.g. carbon and/or glass reinforced epoxy or PEEK or other polyarylenes) or any other suitable structural material providing a suitably high level of strength, stiffness and impact resistance or any suitable combination thereof.

Figure 5:
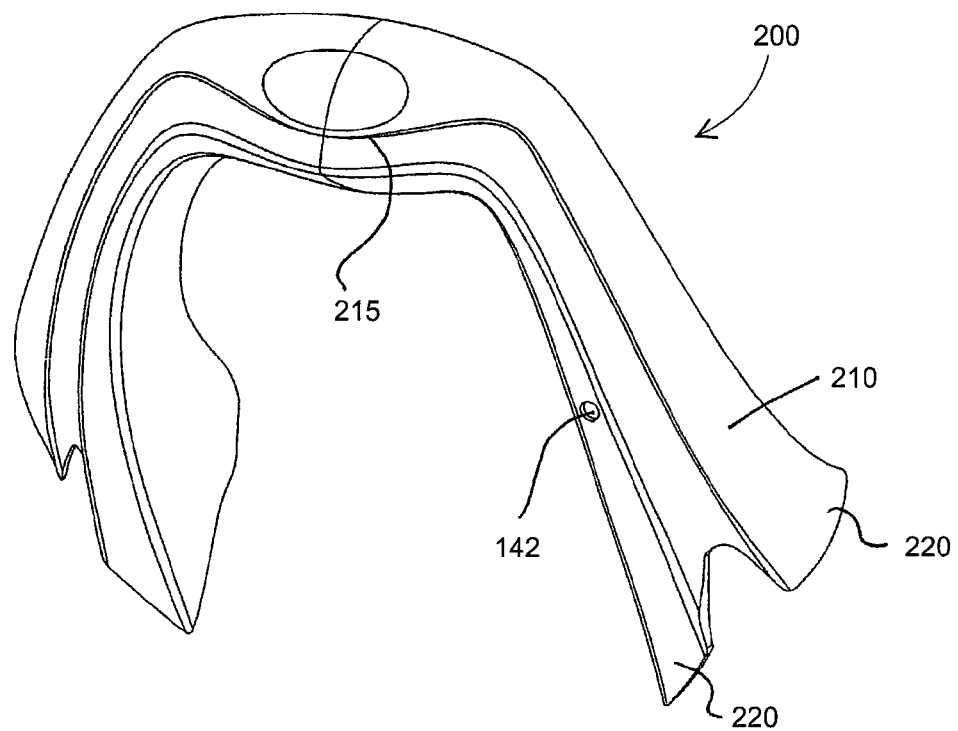
FIG. 5 is a top view of an overlay portion.

FIG. 5 is a front view of an overlay 200 that is designed to fit in a mating relationship over the portion 110 of the brace 300 to create a unitary, structural brace assembly with a substantially tubular cross-section. While the brace 300 is described as having a "tubular" cross section, it is understood that the term "tubular" in this specification relates to any shape that includes a substantially closed or boxed cross-section and is not limited to any particular tubular shape.

Figure 6:
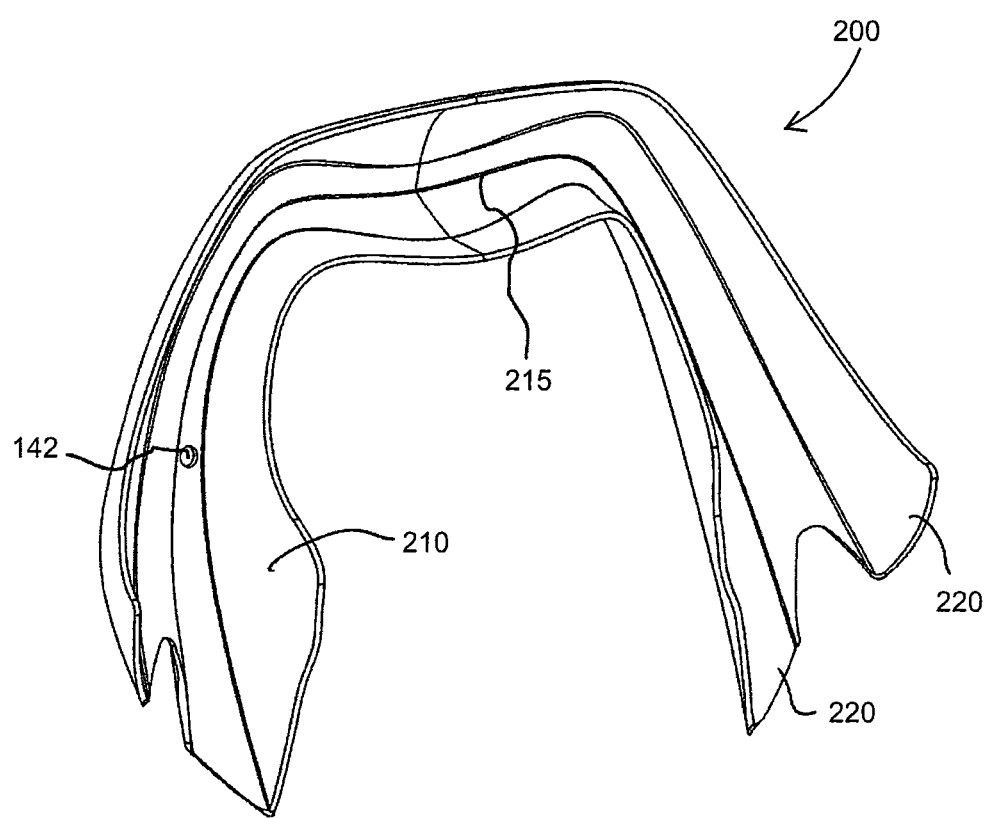
FIG. 6 is a rear view of an overlay portion showing the underside thereof.

FIG. 6 is a rear view of the overlay portion of FIG. 5 showing the underside thereof. As illustrated by the Figures, the overlay 200 is formed with sides 210 constructed and arranged to fit over the sides 130 of the rear portion 110 and having a thickness that, upon assembly, abuts the lower lip 135 that extends around the perimeter of portion 110. In cross section, the overlay 200 has a semi-triangular shape with both sides 210 intersecting to form a crest 215 that provides stiffness and strength to the overlay, especially when it is combined with the rear portion 110. In the embodiment shown, the overlay 200 includes contoured ends 220 that mate with similar formations 112 formed in the rear portion and on the front of the lower fork legs (see FIG. 3). Also included is a formed aperture 142 for receiving a threaded or other fastener (e.g., screw) to facilitate the connection of the overlay to the threaded boss 145 formed in the portion.

The overlay is preferably made of a different material than the fork assembly and in one embodiment is preferably moldable. Optionally the overlay may be made by vacuum bagging, pressing, lay up, in mold lay up, casting or other suitable manufacturing method or combination thereof. While the overlay may be made of a metallic material like magnesium, aluminum, or titanium, it preferably comprises fiber reinforced polymer (e.g. carbon or glass reinforced thermoset or thermoplastic polymer such as for example epoxy or Polyetheretherketone ("PEEK") respectively) or any other suitable structural material, reinforcement or combination thereof. The carbon fiber/epoxy of the overlay may be prepreg fabric and may consist of high or low modulus carbon fiber or any suitable combination thereof. The carbon fiber may be in a woven fabric form, mat fabric form, may be preferentially oriented using unidirectional fiber reinforcement in anticipation of greater stresses in given orientations or may comprise any suitable combination of the foregoing.

Figure 7:
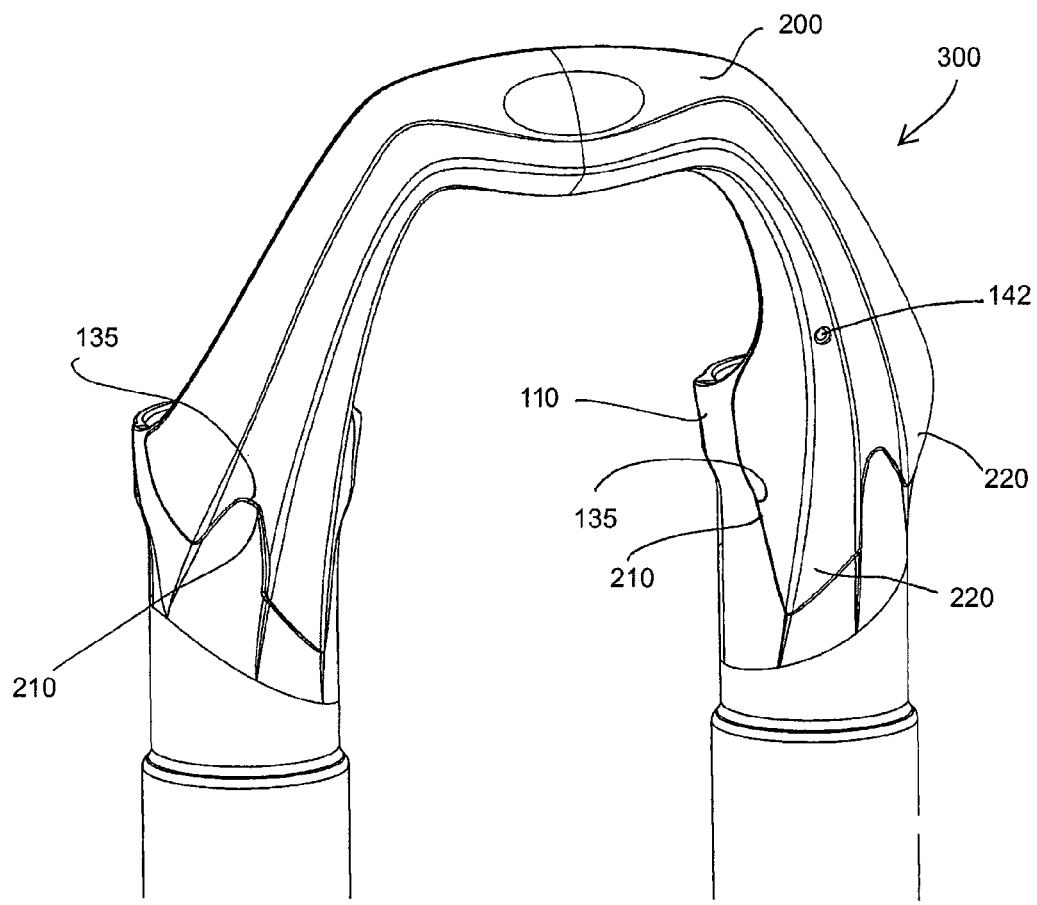
FIG. 7 shows the rear portion and overlay portion mated together to form the brace.

FIG. 7 shows the rear portion 110 and overlay 200 mated together to form the completed brace 300. As shown, the lower edge of the overlay sides 210 fit on the lower lip 135 of the rear portion to make a substantially continuous, supporting connection therebetween. Additionally, the contoured interior surface of the overlay sides 210 (visible in FIG. 6, the rear view of the overlay 200) are at least partially supported by the sloped outer surface of sides 130 of the rear portion 110 (visible in FIG. 3, rear view of the fork assembly). In one embodiment each reinforcement 140 extending from the rear surface 125 contacts an inner surface of the overlay and provides additional support for the overlay and the assembly.

In one embodiment, the rear portion 110 and overlay 200 are glued together with an adhesive material applied around the perimeter of the sides 130 and where the overlay sides 210 meet lip 135 in order to provide a continuous, adhesive connection between both portions of the brace assembly 300. Additionally, the outer edge of each reinforcement 140 is coated with adhesive to create an adhesive arrangement at each point where the reinforcement 140 contacts the inner surface of the overlay 200. Adhesives may include epoxies, cyanoacrylates or other suitable adhesive materials. In one embodiment, the overlay 200 and the rear portion 110 both comprise metal and the assembly is welded. In one embodiment the overlay 200 and the rear portion 110 both comprise thermoplastic and the assembly is thermoplastic welded. In one embodiment both the rear portion 110 and the overlay 200 comprise particulate metal and the assembly is sintered. In one embodiment the overlay 200 is bonded to the rear portion using a heat activated bonding agent (e.g. polar molecule) suitable for action between the overlay material and the rear portion material. Depending on the composition of the overlay 200 and the rear portion 110 any suitable method or material may be used for assembling the brace 300. Also visible in FIG. 7 is aperture 142 leading to threaded boss 145. In this embodiment, the connection between the rear portion and overlay can be further reinforced with a threaded member (such as for example a headed machine screw).

In one embodiment the connection between the overlay 200 and the rear portion 110 is mechanical. In one embodiment the connection comprises rivets. In one embodiment, rather than mating directly along a lip 135 of the rear portion 110, the rear portion may include a channel (not shown) formed around its base in which case the lower edge of the overlay 200 fits within the channel. The channel may have a width slightly smaller than the thickness of edge (and optionally edge 210 may include an "arrow" shaped cross section where channel includes an inverse "arrow" shaped cross section) so that the fit overlaps and/or interferes. Alternatively, the channel may be formed along the lower edge of the overlay 200 and a lip formed around the rear portion 110 could extend into the channel of the overlay 200. Any suitable overlap or blend between the overlay 200 and the rear portion 110 may be used to facilitate a structural connection between the two components. Optionally the overlay 200 may be joined to the rear portion by interference fit, pressure fit, sonic welding or any other means known in the art or connecting similar materials to form a robust connection there between. Optionally, a void formed in the interior of the tubular brace may be filled with a light weight, structural foam. Such form would provide additional structural support and may also serve to connect (e.g. adhere) the overlay 200 to the rear portion 110.

As illustrated in FIG. 7, when fitted together, the overlay and the base are structurally connected to form a unitary, tubular brace between the fork legs that is visually pleasing and/or aerodynamically efficient when viewed from the front or the rear. While not illustrated, the relative positions of the brace portion and the overlay could be reversed whereby the brace portion is disposed at a front end of the fork assembly with an "open" rear for receiving the overlay. The result is, in any case, a unitary, tubular brace with a portion thereof integrally formed between two fork legs.

While the foregoing is directed to embodiments of the present invention, other and further embodiments of the invention may be devised without departing from the scope thereof, and the scope thereof is determined by the claims that follow.

What we claim is:
1. A method for reinforcing a suspension component comprising:
    fabricating a brace portion that comprises:
        a structural cross section having a surface;
        at least one reinforcement member extending from surface; and
        at least one structural tubular member formed at each end of said structural cross section;
    fabricating an overlay, said overlay configured to cover an entirety of an open front of said brace portion; and
    attaching said overlay to said brace portion to form a reinforced suspension component, wherein an entirety of said reinforced suspension component is tubular in cross section.

2. The method of claim 1, wherein said attaching includes the use of adhesive between at least one contact area between said brace portion and said overlay.

3. The method of claim 1, wherein said attaching includes the use of at least one mechanical fastener between said brace portion and said overlay.

\* \* \* \* \*